E. A. KINGSLEY & K. O. CARLSON.
SELF SETTING MECHANISM FOR PIANO PLAYERS.
APPLICATION FILED MAY 4, 1910.

1,070,698.

Patented Aug. 19, 1913.

Witnesses:
Harry S. Gaither
E. Lundy

Inventors:
Edwin A. Kingsley
Karl O. Carlson
By Frank Thomason, atty.

UNITED STATES PATENT OFFICE.

EDWIN A. KINGSLEY, OF NEW YORK, N. Y., AND KARL O. CARLSON, OF CHICAGO, ILLINOIS, ASSIGNORS, BY MESNE ASSIGNMENTS, TO NATIONAL PIANO MANUFACTURING COMPANY, OF GRAND RAPIDS, MICHIGAN, A CORPORATION OF ILLINOIS.

SELF-SETTING MECHANISM FOR PIANO-PLAYERS.

1,070,698.      Specification of Letters Patent.      Patented Aug. 19, 1913.

Application filed May 4, 1910. Serial No. 559,403.

*To all whom it may concern:*

Be it known that we, EDWIN A. KINGSLEY and KARL O. CARLSON, citizens of the United States, residing, respectively, at New York, borough of Manhattan, and State of New York, and at Chicago, county of Cook, and State of Illinois, have invented certain new and useful Improvements in Self-Setting Mechanism for Piano-Players, of which the following is a full, clear, and exact description.

This invention relates to mechanisms for playing musical instruments, such as pianos, organs, or the like, and especially that type of automatic players that are initially released by the depositing of a coin.

The check-controlled and other features, while it is necessary to describe the same in this application to give a clear understanding of the entire device, form no part of the present invention for the same is fully set forth and claimed in a companion application for a coin operated automatic piano, filed March 3, 1909, Serial No. 481,068 from which a portion of the present application was divided.

It is one of the objects of this invention to provide a mechanism of the kind specified that will select and play any one of a repertoire of musical compositions.

Another object of this invention is to so construct the revoluble music-roll magazine that one or more of the rolls of music carried thereby may be readily removed and others substituted therefor without disturbing the remaining rolls of music on said magazine.

It is also an object of this invention to place the tracker-board above the music rolls and to move it downwardly into engagement with the sheet of music. And still another object is to automatically rewind the music rolls by means connected with each carrier that is separately mounted on the magazine.

Besides the above set-forth objects there are others accomplished by this invention which will hereinafter more fully appear, such, for example, as economy of construction, compactness and simplicity of operation. All this is accomplished by the means and in the manner hereinafter fully described and as more particularly pointed out in the claims, reference being had to the accompanying drawings forming a part hereof, wherein:—

The drawings disclose the case and framework of an automatic piano so constructed as to provide a suitable support for, and permit of the assembling of the various parts of this invention, and this may be varied to permit changes in the arrangements of the electrical elements and physical changes of construction of the mechanical devices. Among other features, this framework is provided mediate the ends of the piano with a pair of stanchions A, A, which are provided with bearings *a, a*, for the ends of a horizontal shaft B, on which the revoluble frame for the carriers of the music rolls is mounted. This frame comprises two circular frames C, and the carriers for the music rolls are removably secured to the rims thereof. There are a series of these carriers, preferably, as shown in the drawings, and they are arranged at equal distances apart, and each consists of shield-shaped end-plates D, that are screwed or otherwise removably secured to the rims of the circular frames C and are suitably connected by spacing-bars $d$. Near their outer angles these plates D are provided with bearings for the stationary shafts $b$, $b'$, upon one of which the spool E for the music roll is mounted and upon the other of which the take-up spool F is mounted. The music roll spool E has a small pinion $c$ secured to the sleeve extending from its head and between this pinion and the adjacent frame D of the carrier shaft $b$ is surrounded by a suitable spacing collar $e$. This shaft extends through frame D, and through the bore of a tubular boss $f$, which latter is screwed into said frame D. The end of said shaft is screw-threaded and provided with a suitable nut $g$, and lock-nut if desired, by means of which, (and the nut $g'$ on its opposite screw-threaded end) shaft $b$ is secured in position. The outer end of said boss $f$, is, preferably flanged, and so shaped that it forms a suitable bell-shaped casing G, that surrounds and incloses a suitable clock spring H, whose inner end is secured to boss $f$ and whose outer end is secured to the inner circumference of said casing.

Figure 1:
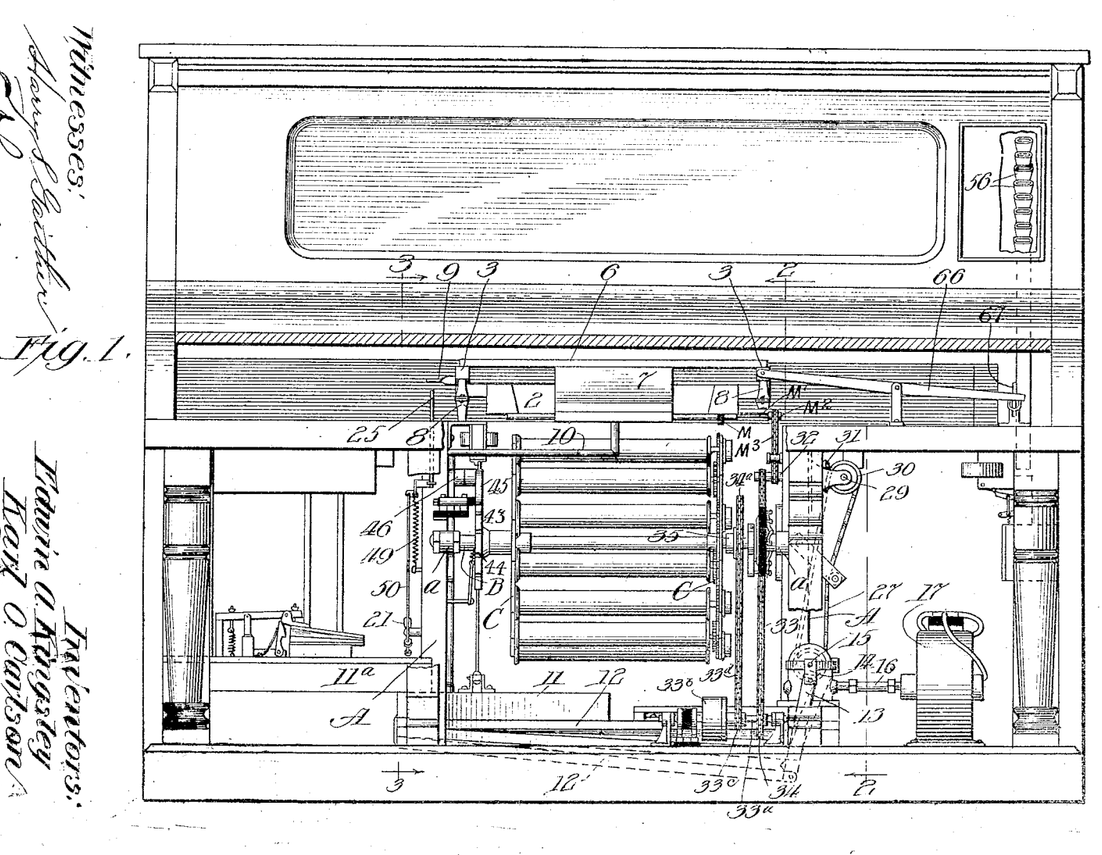
Figure 1 is a front elevation of the improvement showing the frame-work and the case of the piano below the key-board broken away to expose to view the mechanism thereof and the novel features applied thereto.
Figure 2:
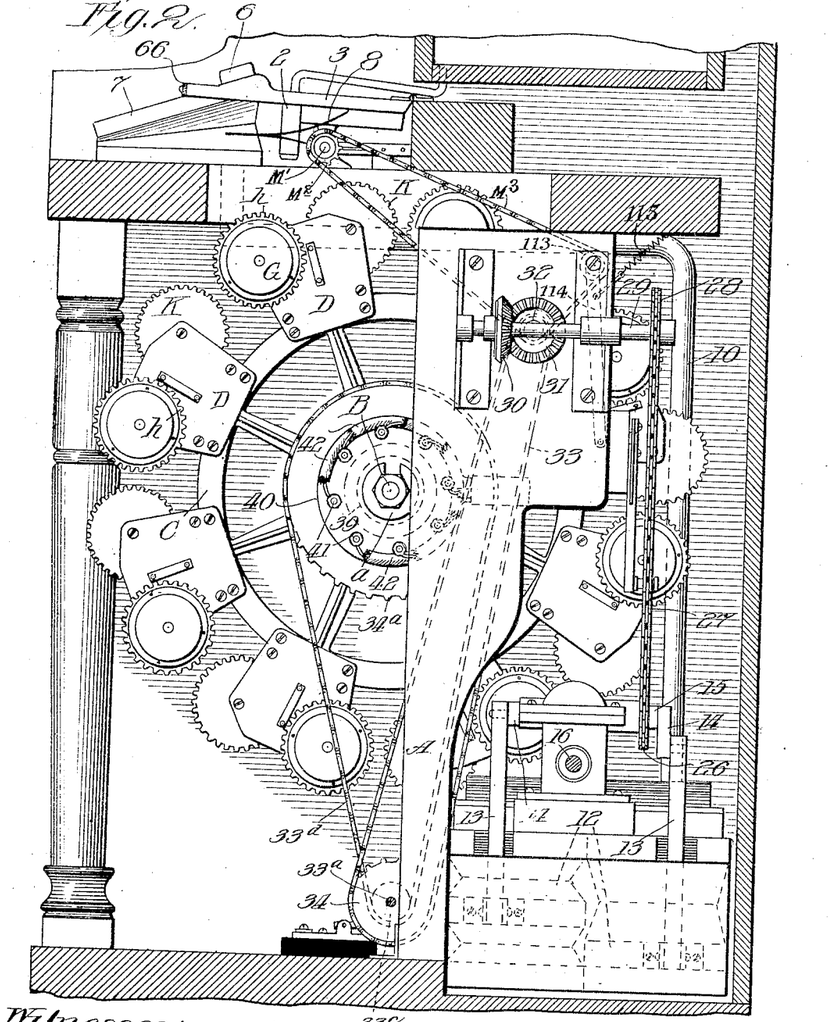
Fig. 2 is a vertical transverse section taken on line 2—2, Fig. 1 drawn to an enlarged scale and looking in the direction indicated by the arrows.
Figure 4:
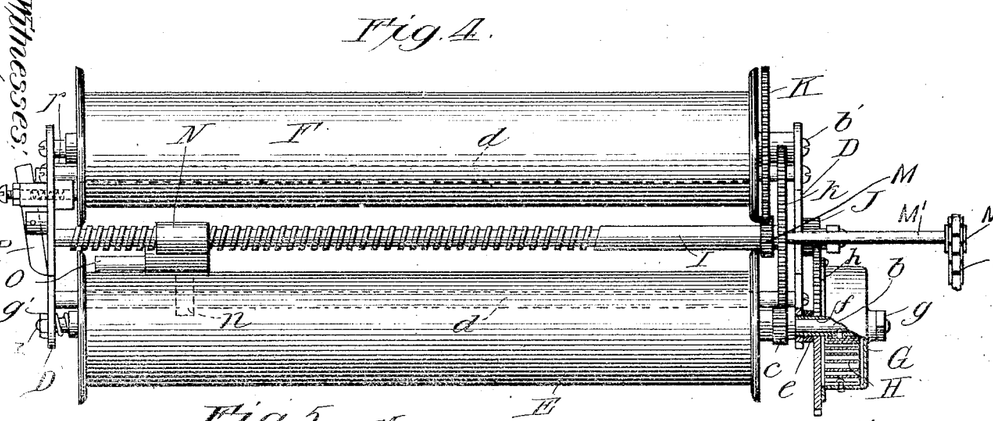
Figs. 4, 5, 6, and 7, are respectively a plan, end views, and a fragmentary section showing in detail one of the carriers for supporting and providing bearings for the spools delivering and receiving the rolls of music, and detached from the magazine.
Figures 5, 7:
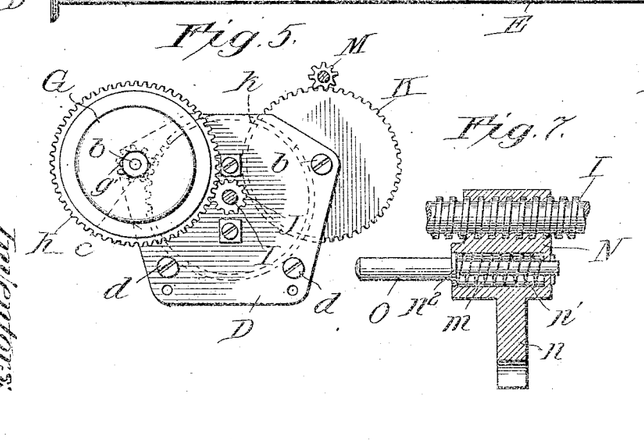
Figure 6:
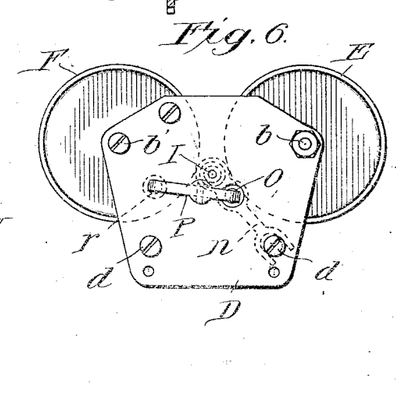
Figure 8:
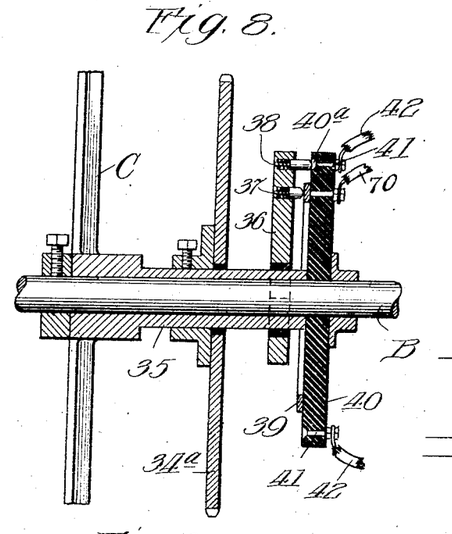
Fig. 8 is a longitudinal central section of a portion of the magazine showing the selective devices carried thereby or connected therewith.
Figures 9, 10:
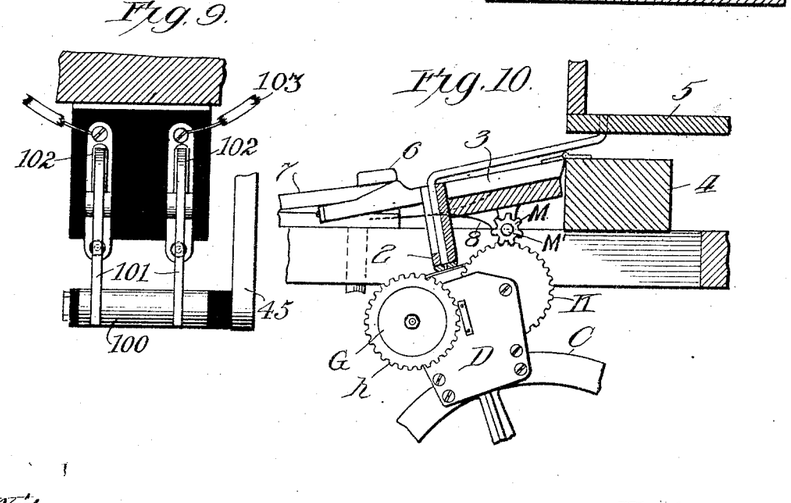
Fig. 9 is a fragmentary view showing the construction of one of the electrical devices used in connection with this mechanism.
Fig. 10 is a detail view showing a transverse section of the tracker-board and an adjacent portion of the magazine, illustrating the manner of operation and engagement of the music-roll by the tracker.

Rigidly secured to the flanged edges of the mouth of the case G, is a gear $h$ that engages a pinion J on the adjacent extended end of a shaft I, which latter is journaled in frames D, D, and extends parallel to and between shafts $b$ and $b'$. Immediately next the inner surface of the adjacent frame D, shaft I is provided with a comparatively large gear $k$ which meshes with the pinion $c$. The take-up or receiving spool F has a comparatively large gear K on its boss, which is engaged by a pinion M, whose shaft M' is journaled in bearings attached to the frame of the tracker-board. Shaft M' has a small sprocket $M^2$ on its outer end that is operated by a chain $M^3$ deriving motion from shaft 32, substantially as shown in Figs. 2 and 4 of the drawings. When gear K is thus engaged the roll of music is wound upon spool F and unwound from spool E, which latter, as it revolves, imparts motion through the medium of pinion $c$, gear $k$, pinion J and gear $h$ to case G and revolves and winds up spring H. When pinion M moves out of engagement with gear K the unwinding of spring H will cause the roll of music to automatically rewind on spool E. To prevent the finish of this rewinding action from being too rapid, and to reduce the speed of and stop the rewinding at the proper moment, the portion of shaft I, farthest from the end on which pinion J is secured, is screw-threaded, preferably, more than half its length. A block N is mounted on this shaft, whose screw-threaded bore engages the threaded portion of said shaft and moves in one direction or the other, according to the direction the shaft is revolving. One side of block N is provided with a tubular enlargement that has a longitudinal bore $m$, in which the reduced end of a plunger O reciprocates longitudinally, and said block also has a laterally projecting arm $n$, whose outer end is bifurcated and passes on either side of one of rods $d$, to prevent said boss from revolving with shaft I. The portion of the plunger within bore $m$ has a coil expansion spring $n'$ on it, which expands between the closed end of said bore, and the collar $n^2$ closing the open end thereof so as to keep said plunger at the limit of its movement in the opposite direction. Plunger O extends through a suitable opening in the adjacent frame D, and when spool E is rewinding the roll of music and block N moves toward the same said plunger will pass through the opening in said frame, and engage one end of a short rocking-bar P, and rock the same so that its opposite branch will press a spring-returnable brake-pin, $r$, longitudinally against the adjacent end of the receiving spool F and retard the revolution thereof and finally stop the same altogether. This pin, $r$, is inclosed and has reciprocal movement within a suitable cylindrical casing that is connected or made integral with frame D.

In operation, as the receiving spool F winds the roll of music upon it, block N moves slowly away from the rocking-bar, and it would require a very long piece of music to move it the length of the screw-threaded portion of shaft I. This block is so positioned on shaft I that the braking action of pin, $r$, would take place at the proper time.

The tracker-board 2 is of the conventional construction and is carried by side-pieces 3 whose forward portions are extended forward beyond the vertical plane of the tracker-board and whose lower edges are connected by a suitable transverse plate. The rear edges of these side-pieces are hinged to a bar 4 arranged parallel to the tracker-board, adjacent to the lower forward portion of the exhaust air-chest 5 and secured to a suitable portion of the frame-work of the piano. The perforations of the tracker-board are connected by suitable flexible tubular connections with said air-chest so as to allow of a limited downward movement of the tracker-board, to bring the same into engagement with the roll of music carried by the cradle of the carrier C at a point between the delivery and take-up spools E and F. The outer extended ends of the side-pieces 3 of the tracker-board frame, are preferably engaged by a horizontal bar 6 that is secured to the upper plate of a bellows 7 mounted on the key-board base of the piano action. Between members 3 and said key-board base are substantially V-shaped leaf-springs, 8 that tend to keep the tracker elevated above the music roll and will return the same to its normal position upon the stopping of the machine. The tracker-board is moved downwardly into engagement with the music-roll by the bellows 7 from which, during the playing of a selection by the piano, the air is kept exhausted through the medium of pipe 10 and air-chamber 11. This exhaust is made continuous by the action of a four part exhaust pneumatic 12 located below the magazine and upon the stationary top of which air-chamber 11 is mounted. The pneumatics consist of two bellows 12, 12, of the usual type except that each has an upper and a lower compartment, and are operated by means of pitmen, 13, 13, whose upper ends are connected to cranks 14, on the ends of a horizontal shaft 15, driven by a suitable electric-motor 17 to which it is connected through the medium of a flexible shaft 16.

Air-chamber 11 is connected to another air-chamber 11$^a$, which latter communicates through the medium of vertically disposed air-shafts or trunks with the air-chest 5. In order to prevent any exhaust of air from the air-chest until after the tracker-board is moved downward into engagement with the roll of music, the orifice connecting chamber 11 and 11$^a$, is closed by a valve 18, which is seated against the lower edges of said opening. Valve 18 has a vertically disposed spindle 19 that extends up through the roof of chamber 11$^a$, where it is surrounded by an expansion-spring 20, the upper end of which bears against a suitable nut and normally keeps the valve at the limit of its upward movement, and this passage between the two chambers closed. The upper end of spindle 19 extends above spring 20 and is engaged by one end of a trip 21, consisting of a short bar which is pivoted mediate its ends to the adjacent stanchion A, and has its end opposite that engaged by spindle 19, flattened and provided with a perforation up through which a vertically disposed rod 22 passes. At a suitable point below trip 21, rod 22 is provided with a suitable head or nut 23, which when said rod is moved longitudinally upward a suitable distance, engages the trip and moves it so that it will depress spindle 19 and open valve 18. The upper end of rod 22 is pivotally connected to the adjacent end of a rocking-bar 24 that is fulcrumed about midway its length to the said stanchion A and extends forward to and terminates under the overhanging end of a finger 9 secured to and projecting from the adjacent end of the tracker-board. The forward end of bar 24 is flattened and provided with a perforation in which the lower reduced end of a vertically disposed reciprocal rod 25 is seated, which latter extends up through a suitable guide-opening in the key-board platform, and terminates just below the overhanging ends of the finger 9. Thus when the tracker-board frame is depressed by the action of the pneumatic 7, rod 25 is depressed, the rocking-bar 24 moved to raise rod 22, which latter does not affect valve 18 until the tracker-board has moved downward into engagement with the roll of music.

Figure 3:
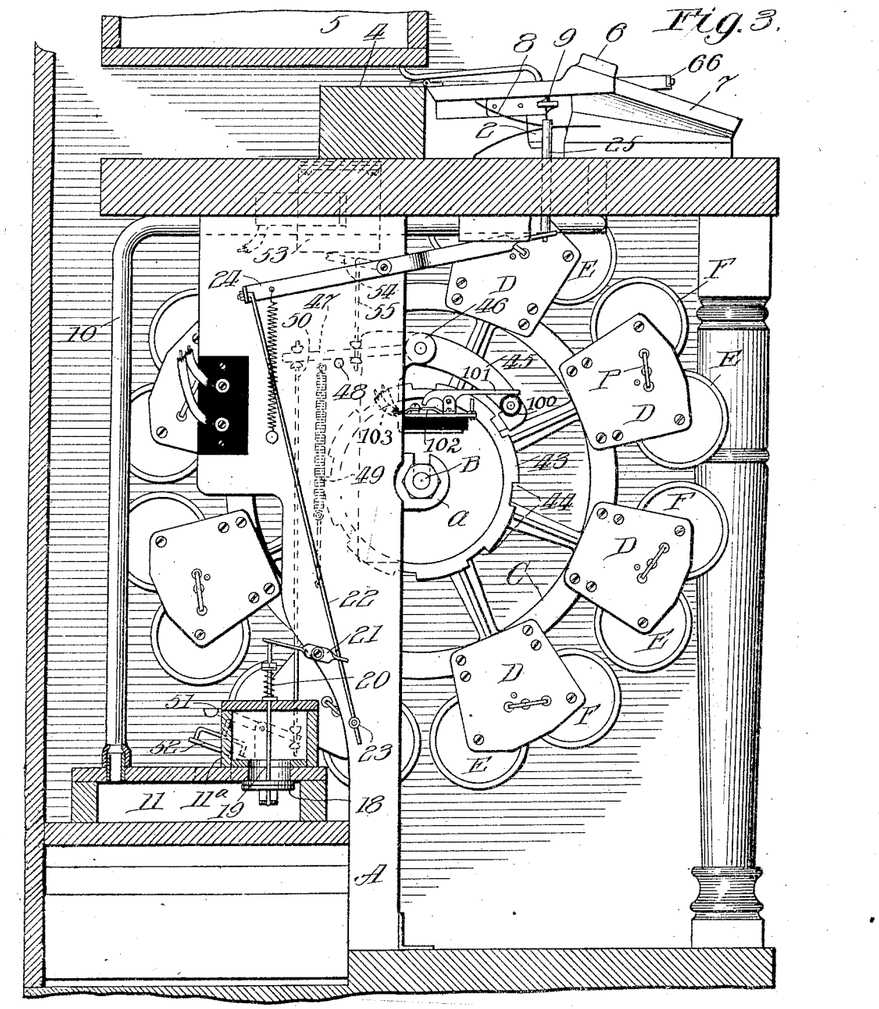
Fig. 3 is a similar view taken on line 3—3, Fig. 1.

Before the tracker-board will be brought into engagement with the roll of music the magazine C automatically revolves to the proper position to bring the music it is desired to play into proper position, and then it is automatically halted and held stationary until the music has been fully played. To accomplish this result shaft 15 is, near its rear end, provided with a suitable sprocket 26 that is connected by the chain 27 to a sprocket 28 on the rear end of a horizontal shaft 29, which latter is journaled in suitable bearings secured to the stanchion nearest the motor. This shaft is provided with a bevel-pinion 30, which engages the bevel-pinion 31 mounted on the end of a drive-shaft 32, that is journaled in suitable bearings and has its axis above and parallel to the adjacent end portion of shaft B. The opposite end of this shaft 32 has a small sprocket thereon and is connected by a chain 33 to a sprocket 34 which is securely mounted on a horizontal idle-shaft 33$^a$. This idle-shaft is journaled in suitable bearings, and, near one end has an electric clutch 33$^b$ mounted thereon, the driving part of which is secured fast to the idle-shaft and the driven part of which is loose on said shaft. The loose driven part of this clutch has a sprocket 33$^c$ secured rigidly thereto, and this sprocket is connected by a suitable chain 33$^d$ to a large sprocket wheel 34$^a$ on the tubular extension 35 of the boss of the adjacent circular-frame C of the music-roll magazine. This tubular extension 35 extends beyond the sprocket 34$^a$ a suitable distance and is provided with an insulated arm 36, which, near its extremity is provided with two transverse spring-seated contact-pins 37 and 38. The contact-pin 37, nearest shaft B has its outer end in constant contact with a metal annulus 39, which latter is concentrically mounted upon a suitable fixed disk 40 of insulating material, and constitutes a terminal of a selecting circuit. The outer end of contact-pin 38 extends to and comes in contact with the adjacent surface of a stationary contact 40$^a$, at a point beyond the circumference of annulus 39, and as the sprocket and carrier revolve comes in contact with equi-distant terminal posts 41, one after the other, each of which is connected by a wire 42 to one of the coin-chutes, substantially as hereinafter more fully described. The circular frame C of the music carrier, opposite sprocket 34ᵃ, also has its boss extended toward the adjacent bearings, and has secured to the end of this boss a ratchet or locking member 43 whose perimeter has, instead of the conventional teeth, a series of equi-distant notches 44 the number and relative location of which correspond to that of the terminal contact-posts 41. These notches are adapted to be engaged by the off-set end or detent of pawl 45, the boss of which is pivoted upon a stud 46, suitably secured to and projecting from the adjacent stanchion A, substantially as shown. Pawl 45 has a rearward extension 47, the downward movement of which is stopped by a pin 48 projecting from the stanchion and this is normally retained at the limit of its downward movement by a contraction spring 49 connecting it to the stanchion A at a suitable point below the same, substantially as shown by dotted lines in Fig. 3. The rear end of this extension 47 is connected by means of a connecting rod 50 to the forward end of a rocking-bar 51, which latter is fulcrumed between standards secured to and rising from the air-chamber 11. The opposite or rear end of this rocking-bar is provided with valve 52 that engages and is adapted to open and close an opening in the roof of said chamber.

Near the detent on the end of pawl 45 the latter is provided with a lateral stud on which a roller 100 having an insulated metallic circumference is journaled. This roller 100, is adapted to engage the underside of the longer branches of two corresponding pivoted insulated switch-bars 101, 101, when the pawl is at the limit of its movement away from the ratchet, and thus keep the hooked ends of said switch-bars in engagement with the brush terminals 102, of a clutch-circuit, 103. This latter circuit has the electric clutch connected up with it, which latter, as heretofore explained, imparts motion through the medium of the chain to the large gear of the magazine shaft. When the tracker-board comes in contact with the music roll, a small pinion M, which is fast on a shaft 111 journaled in suitable bearings back of and parallel with the said board, engages the large gear K secured directly or indirectly to the take-up spool F, and revolves the latter so that said music roll is wound upon the same during the operation of the piano. Shaft 111 extends beyond the end of the tracker-board frame adjacent to drive-shaft 32, and is connected to and driven by the latter through the medium of a sprocket 110 on its end by a chain or belt 112. Chain 112 is passed around an idler 113 journaled in the movable end of a pivoted arm 114, that has a coiled contraction spring 115 connected thereto, and together therewith, constitutes a belt-tightener that operates to keep the chain 112 taut while at the same time accommodating the movement of the tracker-board frame to and from the music-roll.

When the carrier is caused to revolve to the proper point where the desired piece of music can be engaged by the tracker-board by depositing a coin in the slot indicated by the titles of said piece of music, substantially as hereinafter more fully explained, a magnet 53, will become energized, and its armature 54 that is connected to the extension 47 by a rod 55, will lift said extension and bring the detent of the pawl 45 into engagement with the proper notch 44 of the ratchet 43, and thus arrest the further movement of the music magazine. When this takes place valve 52 will automatically close, and the flow of air which had previously been drawn into chamber 11 by the action of pneumatics 12, will cease, and the exhaust (through the pipes 10) from the pneumatics 9 will take place, and, in the manner hereinbefore explained, move the tracker-board frame downward and bring said tracker-board into engagement with the music roll so selected.

In order to accomplish the initial operation of the mechanism just described the piano is provided with a series of coin-chutes 56 that are located, preferably, near one end of the piano above the plane of the key-board and their widened intake mouths constitute the slots, arranged one above the other, into which the coin necessary to actuate the said mechanism is deposited. There are the same number of these chutes 56 as there are music rolls carried by the magazine and they are each designated by the title of the particular piece of music with which it is identified.

Figure 11:
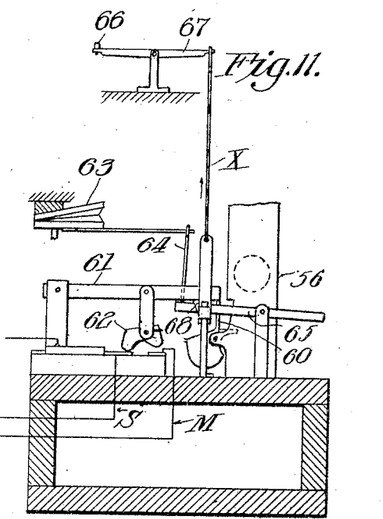
Fig. 11 is a diagrammatical side elevation of the contact used in connection with this invention for starting the mechanism.
Figure 12:
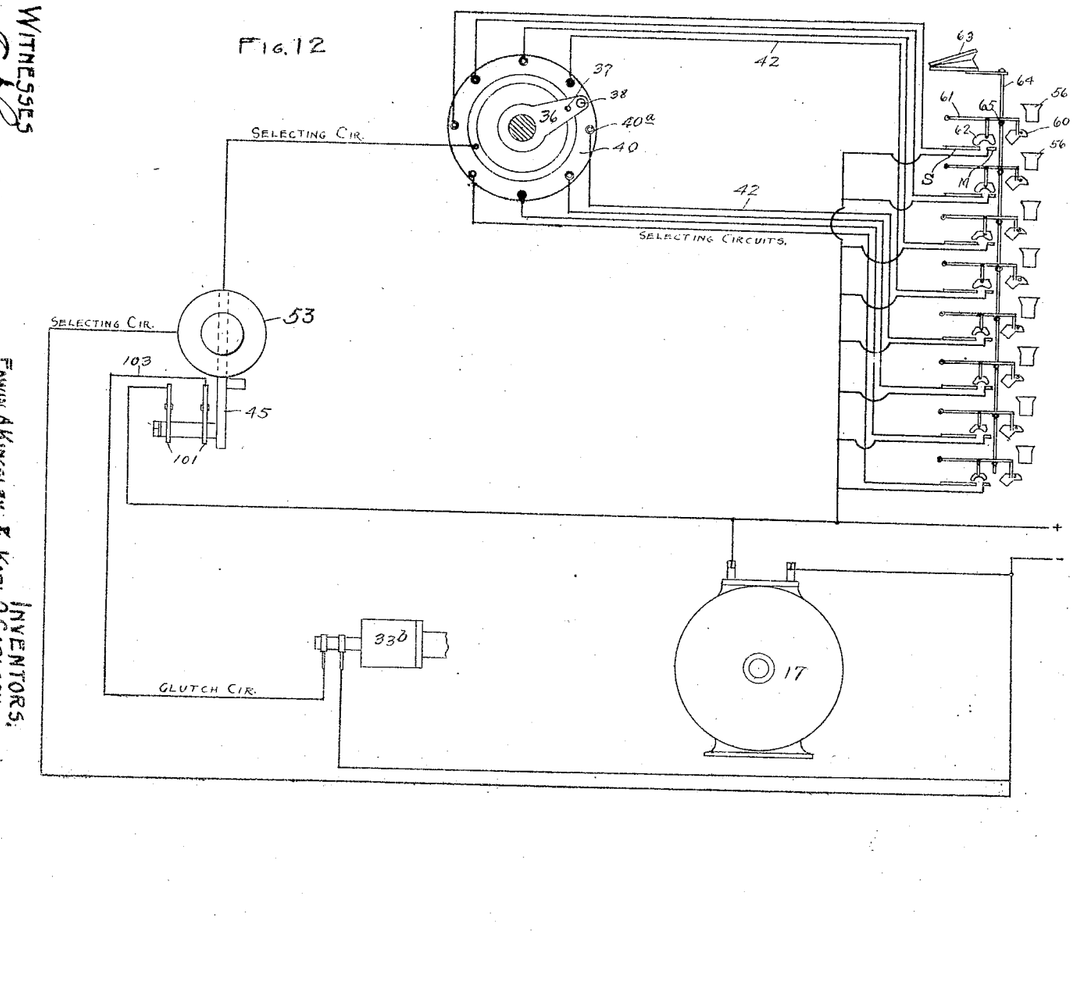
Fig. 12 is a diagrammatical view disclosing the electrical scheme involved in our invention.

The lower end portion of each coin-chute is vertically disposed and terminates at a suitable coin box upon which latter a suitable contact is mounted. The details of this contact are fully set forth in an application for Letters Patent of the United States, filed January 10th, 1910, by Edgar B. Sherman, Serial Number 537,313, and therefore need no specific mention here. The object of this device is to provide contacts which make the circuit to energize the driving motor and start the machine, and also the separate circuit for operating the music roll selector mechanism. By this novel arrangement of parts persons are prevented from "beating" the machine; that is, causing the machine to play more than one tune upon depositing but a single coin. The device is shown somewhat diagrammatically in Fig. 11 of the drawings, where it will be seen that a pawl 60 is pivoted to one end wall of the coin chute 56 and there is a series of these devices, one for each chute. This pawl is weighted on one side and on the opposite edge has an arm that projects into the chute to be engaged by the falling coin. Another arm rises vertically and supports a horizontally arranged row of suitable contact-carrying bars 61, 61 (only the end one of which is shown) and these latter bars are supported at their opposite ends by a horizontally disposed pivotal member. Intermediate the ends of the carrier-bar are suitable swinging contact feet 62 that are substantially V-shaped and the lower ends of the members of which are adapted, when the pawl is released, to engage contacts M, S. Contact M comprises a plate extending longitudinally under the entire series of contact feet 62 and forms one member of the "motor circuit." Contacts S for the "selector circuits," are arranged in a series, one for each contact foot 62, at substantially right angles to and extending away from the "motor circuit" contact M. When the contact has been made, it will be seen that both the motor and selector circuits are energized by the one action of the device.

When the last note of a musical selection has been played, a small perforation in the music roll passes under an independent or auxiliary pneumatic tube located outside of the register of the piano-action on the tracker and actuates a bellows 63, which, upon closing raises an arm 64 secured to a U-shaped resetting frame 65. The connecting member of the resetting frame passes under all of the carrier bars 61 and upon being elevated raises the same and breaks the circuits M and S. Another manner of making and breaking these circuits is through the medium of the tracker-board itself. This mechanism comprises a suitable horizontally disposed lever 66 fulcrumed mediate its length to a bracket arising from the key-bed of the piano, and having one end secured to or engaging the under portion of one of the side-plates 3 of the tracker-board. The opposite end of this lever is operatively connected to the adjacent end of another similar lever 67 that extends rearwardly where it has the upper end of a vertically disposed rod X secured thereto. The lower end of this rod is provided with a spring-latch 68 that depends therefrom and is adapted to engage and raise the resetting lever 65, in substantially the same manner as when said resetting lever is operated by the bellows 63. As the tracker-board is adapted to be lifted from the music sheet each time the current is turned off, it will be seen that this movement will also cause the selector circuit and the motor circuit to be instantly broken and the machine stopped until another coin is deposited.

What is claimed as new is:—

1. In a machine of the kind specified, a revoluble frame, carriers secured to the same, music-rolls mounted in said carriers, a hinged overhead tracker-board movable downward to engage the music-sheet, and pneumatic means for moving said tracker.

2. In a machine of the kind specified a revoluble frame having stationary bearings, carriers secured to the same, music rolls mounted in said carriers, a hinged overhead tracker-board movable downward to engage the music sheet, and pneumatic means for moving said tracker.

3. In a machine of the kind specified a revoluble frame, removable carriers secured to the edge thereof, music rolls mounted in said carriers, a hinged overhead tracker-board movable downward to engage the music sheet, and pneumatic means for moving said tracker.

4. In a machine of the kind specified a revoluble frame, carriers secured to the same, music rolls mounted in said carriers, a delivery spool and take-up spool journaled in each of said carriers, a hinged overhead tracker-board movable downward to engage the music sheet and pneumatic means for moving said tracker.

5. In a machine of the kind specified, a revoluble frame, carriers secured to the same, music rolls mounted in said carriers, a delivery-spool and take-up spool journaled in each of said carriers, and means for automatically rewinding said delivery-spool, an overhead tracker-board movable downward to engage the music sheet, and pneumatic means for moving said tracker.

6. In a machine of the kind specified a revolving frame, carriers secured to the edge thereof, a delivery-spool and take-up spool journaled in each of said carriers, a clock-spring for rewinding said delivery-spool one end of which is secured to the spindle of said delivery-spool and the opposite end is secured to said carrier, a tracker-board and revolving means carried by said tracker-board for revolving said take-up spool.

7. In a machine of the kind specified a revolving frame, carriers secured to the edge thereof, a delivery-spool and take-up spool journaled in each of said carriers, a clock-spring for rewinding said delivery-spool one end of which is secured to the spindle of said delivery-spool and the opposite end is secured to said carrier, a downwardly movable overhead tracker-board and revolving means carried by said tracker-board for revolving said take-up spool.

8. In a machine of the kind specified a revolving frame, carriers secured to the edge thereof, a delivery-spool and take-up spool journaled in each of said carriers, a clock-spring for rewinding said delivery-spool surrounding and secured to one of the journals of said delivery spool at one end and connected to the carrier at its opposite end, a tracker-board and revolving means carried by said tracker-board for revolving said take-up spool.

9. In a machine of the kind specified a revolving frame, carriers secured thereto, a delivery-spool and take-up spool journaled in each carrier, automatic mechanism that rewinds the delivery-spool and a brake that engages the take-up spool and stops it before the roll is entirely rewound.

10. In a machine of the kind specified a revolving frame, carriers secured thereto, a delivery-spool and take-up spool journaled in each carrier, automatic mechanism that causes the delivery-spool to rewind thereon and a longitudinally movable brake-pin adapted to engage the end of the take-up spool and stop it before the roll is entirely rewound.

11. In a machine of the kind specified, a carrier for the music sheets comprising a delivery-spool, a parallel take-up spool, a shaft journaled in the frame of said carrier between said spools, and actuated by one of them, a reciprocal brake pin that engages the end of the take-up spool as the rewinding of the music on the delivery spool approaches completion, and means for transmitting motion from said shaft to said pin.

12. In a machine of the kind specified, a carrier for the music sheets comprising a delivery-spool, a parallel take-up spool, a shaft journaled in the frame of said carrier between said spools, and actuated by one of them, a reciprocal brake pin that engages the end of the take-up spool as the rewinding of the music sheet on the delivery-spool approaches completion, a block movable longitudinally on said shaft according to the direction the latter revolves, and a rocking-bar actuated thereby and engaging said pin.

Signed by me, EDWIN A. KINGSLEY, this 26th day of April, 1910.

EDWIN A. KINGSLEY.

Witnesses for said Kingsley:
WILLIAM H. WEBBER,
E. B. WEBBER.

Signed by me, KARL O. CARLSON, this 13th day of April, 1910.

KARL O. CARLSON.

Witnesses for said Carlson:
E. K. LUNDY,
E. B. SHERMAN.